US007822978B2

(12) United States Patent
Young et al.

(10) Patent No.: US 7,822,978 B2
(45) Date of Patent: Oct. 26, 2010

(54) QUIESCING A MANAGEABILITY ENGINE

(75) Inventors: David W. Young, Portland, OR (US); Michael N. Derr, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1075 days.

(21) Appl. No.: 11/187,712

(22) Filed: Jul. 22, 2005

(65) Prior Publication Data

US 2007/0033311 A1 Feb. 8, 2007

(51) Int. Cl.
*H04L 29/06* (2006.01)
(52) U.S. Cl. .................................................... 713/164
(58) Field of Classification Search .................. 713/164
See application file for complete search history.

(56) References Cited

U.S. PATENT DOCUMENTS

| 7,340,568 B2 * | 3/2008 | Goodman et al. ........... 711/146 |
| 2003/0188165 A1 | 10/2003 | Sutton et al. |
| 2004/0128416 A1 * | 7/2004 | Kurts et al. ................. 710/107 |
| 2004/0260565 A1 * | 12/2004 | Zimniewicz et al. ........... 705/1 |
| 2005/0144476 A1 | 6/2005 | England et al. |
| 2005/0193099 A1 * | 9/2005 | Reus et al. .................. 709/220 |
| 2005/0246771 A1 * | 11/2005 | Hunt et al. .................... 726/18 |
| 2006/0059285 A1 * | 3/2006 | Fischer et al. ............... 710/124 |

FOREIGN PATENT DOCUMENTS

| EP | 1 209 563 A2 | 5/2002 |
| EP | A2-1 209 563 | 5/2002 |
| WO | WO 95/33239 | 12/1995 |
| WO | WO 03/085497 A2 | 10/2003 |
| WO | WO 03/090074 A2 | 10/2003 |

OTHER PUBLICATIONS

Intel, "New Intel Platforms Drive Innovation for the Home and Office", Technology @ Intel Magazine, Jul. 2005, pp. 1-7.
Intel, "Intel Active Management Technology, Intel IT tests reducing IT spending through improved manageability", IT@Intel, Aug. 2004, pp. 1-12.
Intel, "Intel Active Management Technology, New capabilities for improving IT platform management efficiency", Technology Brief, 2005, 3 pages.
Intel, "Secure Provisioning for PCs with Intel 945/955 Express Chipset and Intel Active Management Technology" White Paper, Jun. 2005 Revision 1.0, 19 pgs.

(Continued)

*Primary Examiner*—Kambiz Zand
*Assistant Examiner*—Stephen Sanders
(74) *Attorney, Agent, or Firm*—Blakely, Sokoloff, Taylor & Zafman LLP

(57) ABSTRACT

Embodiments of the invention are generally directed to a methods, apparatuses, and systems for quiescing a processor bus agent. In one embodiment, a processor initiates the establishment of a protected domain for a computing system. A processor bus agent coupled with the processor is quiesed to reduce the potential for interference with the establishment of the protected domain. Other embodiments are described and claimed.

31 Claims, 6 Drawing Sheets

OTHER PUBLICATIONS

Marr et al, "Hyper-Threading Technology Architecture and Microatrchitecture", Intel Technology Journal Q1, 2002, pp. 1-12.

Ramanathan, "Intel's T's Deliver New Platform Enhancements Beyond Gigahertz", Technology@Intel Magazine Dec. 2004/Jan. 2005, pp. 1-8.

Binstock, "Intel Virtualization Technology: A Primer", Jun. 15, 2005, 8 pgs.

Intel, "Intel Virtualization Technology Specification for the 1A-32 Intel Architecture", C97063-002, Apr. 2005, 144 pgs.

Grawrock "LaGrande Architecture SCMS-18", Sep. 2003, pp. 1-57.

Itnel, "Enhanced Virtualization on Intel Architecture-based Servers", Mar. 2005, pp. 1-8.

Intel, "Intel Virtualization Technology Secification for the Intel Itanium Architecutre (VT-i)", Revision 2.0, Apr. 2005, Document No. 305942-002, 100 pgs.

Intel, "Reliability, Availability, and Serviceability for the Always-on Enterprise", May 2005, pp. 7-11.

Int'l Application No. PCT/US2006/026382 filed Jul. 6, 2006; Intl'Search Report & Written Opinion dated Dec. 4, 2006.

PCT International Preliminary Report on Patentability PCT/US2006/026382 mailed Jan. 31, 2008 (2 pages).

PCT Written Opinion PCT/US2006/026382 mailed Jan. 31, 2008 (5 pages).

German Patent Application 11 2006 001 933.3-53, Office Action Mailed Nov. 18, 2008, 5 pages.

Office Action from Foreign Counterpart Chinese Patent Application No. 200680026117.0, mailed May 7, 2009, 10 pgs. (Translation included).

CN PTO, "Office Action", Chinese Application No. 200680026117.0, mailed May 7, 2009., 4 pages.

CN PTO, "Second Office Action", Chinese Application No. 200680026117.0, Mailed Oct. 21, 2009., whole document.

* cited by examiner

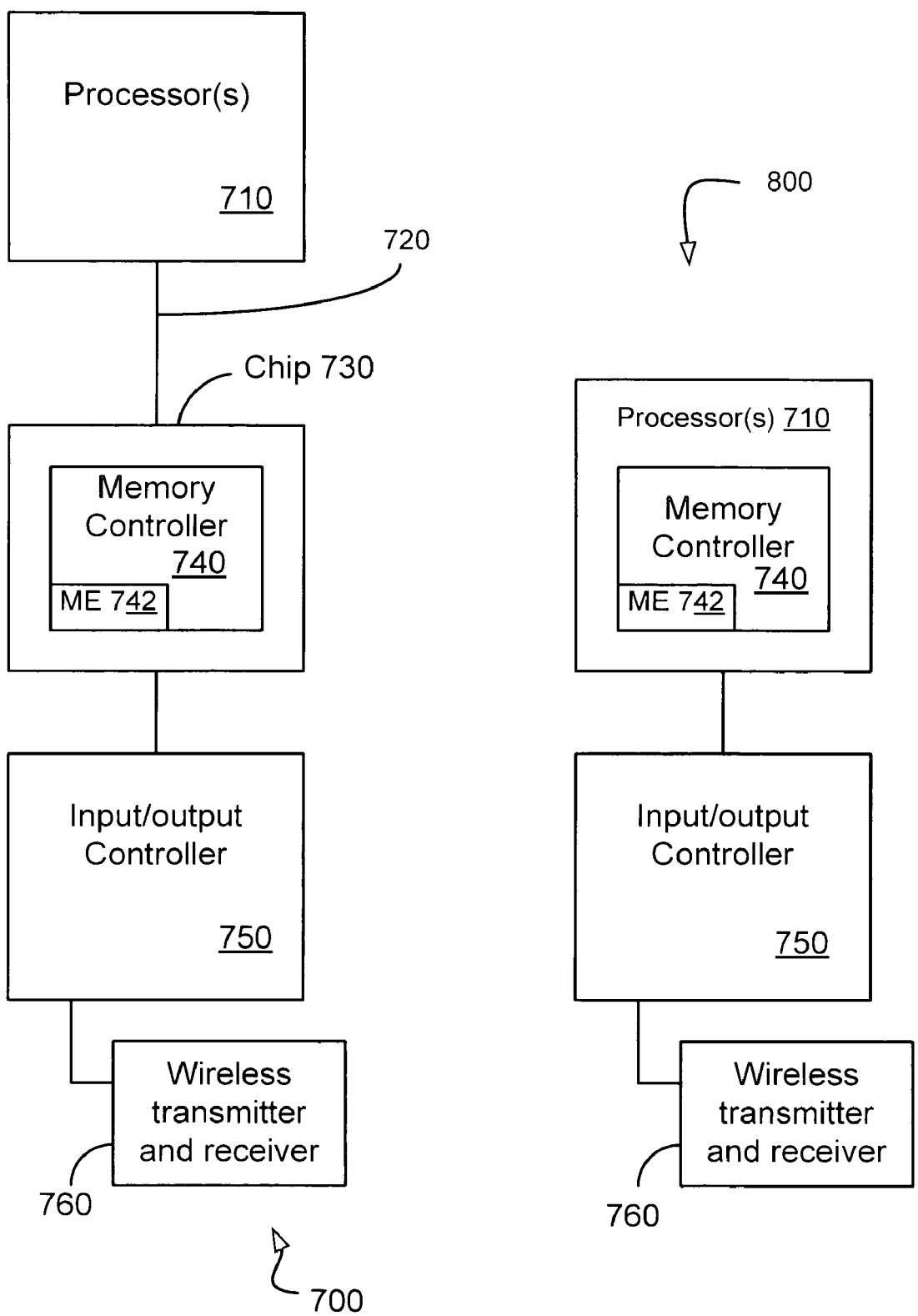

QUIESCING A MANAGEABILITY ENGINE

TECHNICAL FIELD

Embodiments of the invention generally relate to the field of data processing and, more particularly, to apparatuses, methods, and systems for quiescing a processor bus agent.

BACKGROUND

Computing systems frequently operate on sensitive and confidential information. In some cases, this information is attractive to hackers (and/or other malicious entities) because it is valuable. Computing systems are using increasingly sophisticated security features to protect the valuable information on which they operate. In some cases, these security features enable a computing system to establish a protected domain. The term "protected domain" refers to an execution environment in which software is substantially isolated from unauthorized software.

Many computing systems also include manageability features to support the remote management of the computing system. These manageability features may include a variety of hardware (e.g., a microcontroller), firmware, and/or software components that are frequently implemented in the chipset of the computing system. In some cases, these manageability features provide access to the processor bus, memory, and other potentially sensitive components of the managed system.

In some cases, the manageability features of a computing system can interfere with the security features of the computing system. For example, the manageability features of the computing system typically allow a remote system to access and control various aspects the computing system. A hacker (or other malicious entity) may misuse the access and control provided by the manageability features to compromise one or more security features.

One example of the potential for misusing the manageability features of a computing system is using these features to interfere with the establishment of a protected domain. The establishment of a protected domain typically includes a join process to enable one or more processors of the computing system to join the protected domain. A hacker could misuse the manageability features of a computing system to prevent a processor from joining the protected domain. This processor could then be "hijacked" and (possibly) used to compromise sensitive data on the computing system.

BRIEF DESCRIPTION OF THE DRAWINGS

Embodiments of the invention are illustrated by way of example, and not by way of limitation, in the figures of the accompanying drawings in which like reference numerals refer to similar elements.

FIGS. 7A and 7B are block diagrams illustrating selected aspects of computing systems.

DETAILED DESCRIPTION

Embodiments of the invention are generally directed to methods, apparatuses, and systems for quiescing a processor bus agent. The term "processor bus agent" refers to a component that has access to the processor bus (e.g., the front-side bus) of a computing system. The processor bus agent may support a manageability feature for a computing system. In an embodiment, a processor initiates the establishment of a protected domain for the computing system. The processor bus agent is quiesed responsive, at least in part, to initiating the establishment of the protected domain. As is further described below, the ability of the processor bus agent to interfere with the establishment of the protected domain is reduced because it is quiesed.

Figure 1:
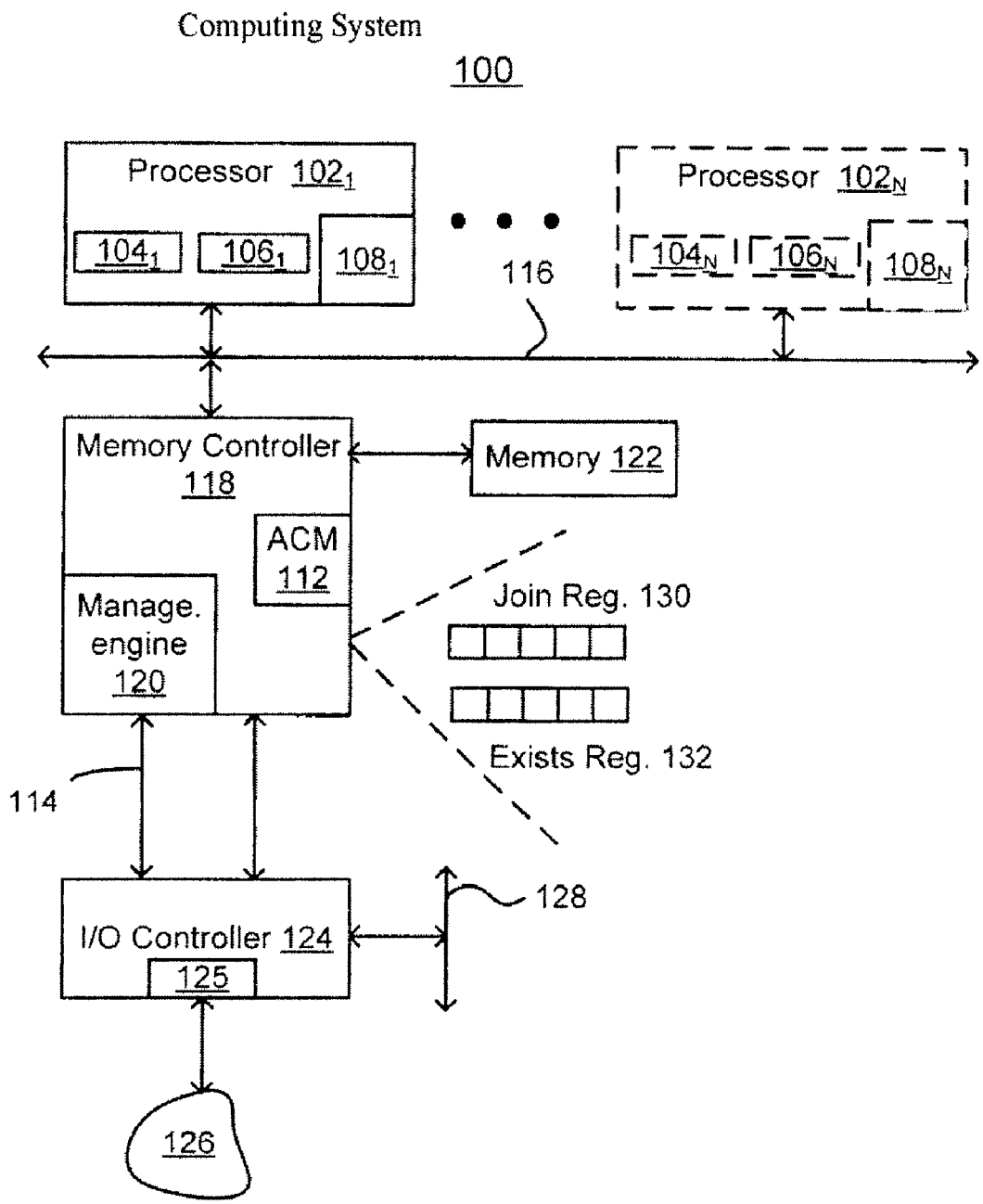
FIG. 1 is a high-level block diagram illustrating selected aspects of a computing system implemented according to an embodiment of the invention.

FIG. 1 is a high-level block diagram illustrating selected aspects of a computing system implemented according to an embodiment of the invention. Computing system 100 includes one or more processors $102_1$-$102_N$. The term processor can refer to a physical processor and/or a logical processor. A physical processor can include, for example, a central processing unit, a microcontroller, a partitioned core and the like. A logical processor refers, for example, to the case in which physical resources are shared by two or more threads and the architecture state is duplicated for the two logical processors. For example, physical processors $102_1$ and $102_N$ respectively include logical processors $104_1$-$104_N$ and $106_1$-$106_N$. Logical processors $104_1$-$104_N$ and $106_1$-$106_N$ may be, for example, threads, hyper-threads, bootstrap processors, initiating logical processors, responding logical processors, and the like. Protected memory 108 provides a protected memory (and/or a protected region of memory) for instructions and/or data that may be processed by a processor.

Processors $102_1$-$102_N$ are coupled with memory controller 118 through processor bus 116. Memory controller 118 controls (at least partly) the flow of information between processors 102 and a memory subsystem. In an embodiment, memory controller 118 includes manageability engine 120 and authenticated code module(s) 112. Manageability engine 120 may include hardware, software, and/or firmware to support one or more management functions. For example, manageability engine 120 may include a microcontroller, protected memory, and/or a protected communication channel. Manageability engine 120 is further discussed below with reference to FIGS. 3 and 4.

In an embodiment, memory controller 118 includes one or more authenticated memory modules 112. Authenticated memory modules 112 may provide trusted code (and/or data) to provide certain functions for computing system 100. In an embodiment, the trusted code (and/or data) can be stored in authenticated memory modules 112 can be located into protected memory 108 and executed by a processor. The code is trusted, in part, because it is securely stored and/or authenticated prior to use. In an embodiment, the protocol for establishing a protected domain is stored in an authenticated memory module 112. Memory 122 provides volatile memory for computing system 100. In one embodiment, memory 122 includes one or more dynamic random access memory (DRAM) devices.

Input/output (I/O) controller 124 controls, at least in part, the flow of information into and out of computing system 100. In one embodiment, manageability engine 120 has a private communication link 114 with I/O controller 124. Private communication 114 link supports a private link between an external entity (e.g., a management console) and manageability engine 120. Interface 128 represents one or more I/O interfaces. These interfaces may include, for example, universal serial bus (USB), peripheral component interconnect (PCI), PCI express, and the like. In addition, I/O controller 124 includes one or more wired or wireless network interfaces 130 to interface with network 126.

Figure 2:
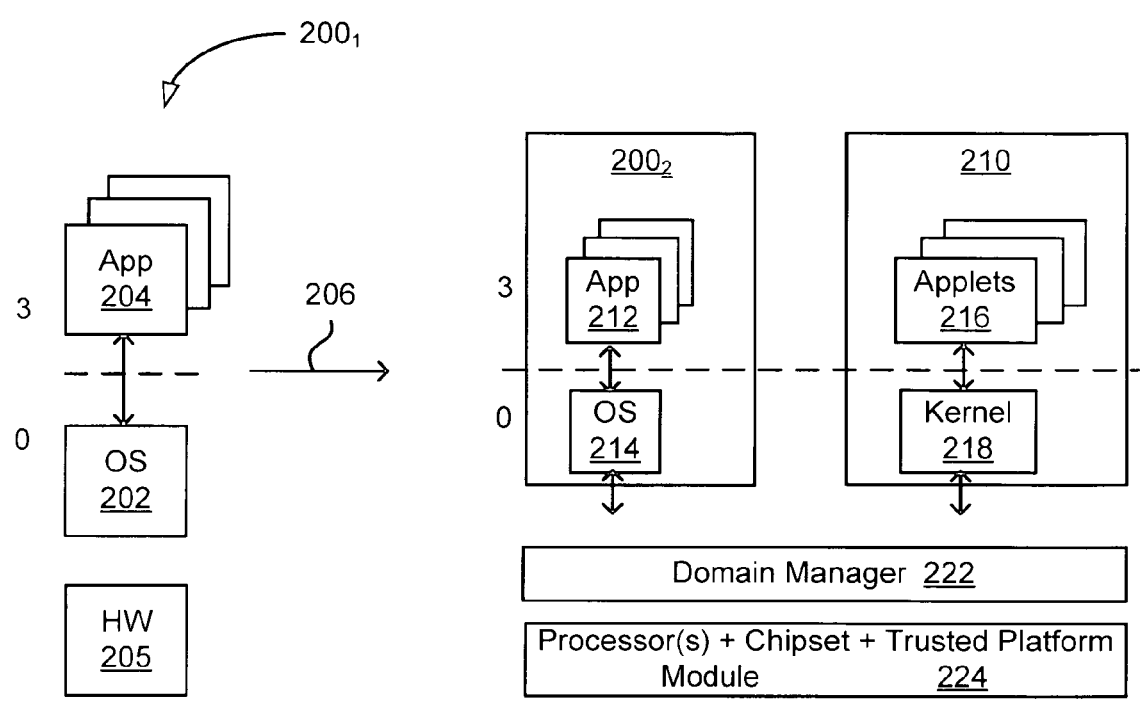
FIG. 2 is a conceptual diagram illustrating the process of establishing a protected domain.

In an embodiment, computing system 100 supports a number of security features such as the ability to establish a protected domain. FIG. 2 is a conceptual diagram illustrating the process of establishing a protected domain. Initially, computing system 100 includes a standard domain 200. Standard domain 200 may include an operating system 202 and one or more applications 204. Operating system 202 may be classified as a ring-0 agent because it has the highest level of access rights. In contrast, applications 204 may be classified as ring-3 agents because they have a reduced set of access rights. Hardware 205 (e.g., processor(s), chipset, memory, etc.) supports standard domain $200_1$.

At an arbitrary moment in time, a component of the computing system (typically a ring-0 component) requests the launch of a protected domain 210. An implementation of a protocol defining (at least in part) the establishment of the protected domain may be stored in an authenticated code module (e.g., 112, shown in FIG. 1) and loaded (or partly loaded) into a protected memory (e.g., 108, shown in FIG. 1). The launch (or establishment) of protected domain 210 is typically implemented in stages. Among the first stages of the establishment process is a join process. The join process allows each of the processors (physical and/or logical) to join protected domain 210. In an embodiment, the processor instruction GETSEC(SENTER) triggers the join process. In one embodiment, registers (e.g., exists register 132 and join register 130, shown in FIG. 1) support the join process. Exists register 132 has an entry corresponding to each processor in the computing system. As each processor joins the protected domain, an entry in join register 130 is set. In one embodiment, when join register 130 has a matching entry for each entry in exists register 132, then all processor have joined the protected domain.

After the join process is complete, domain manager 222 is loaded into memory from, for example, an authenticated code module. Domain manager 222 provides isolation between standard domain 208 and protected domain 210. Protected domain 210 may include applets 216 and kernel 218. The term kernel refers to software that provides an interface between hardware and higher-level software. An applet is a software component that processes data. In an embodiment, Hardware 224 supports both standard domain $200_2$ and protected domain 210. In one embodiment, the standard domain $200_2$, includes an operating system 214 and application 212 that runs on the operating system 214. Hardware 224 may include, for example, one or more processors, chipsets, and trusted platform modules. A trusted platform module refers to a chip that provides one or more trusted computing features.

In an embodiment, one or more processor bus agents may be dynamically quiesced to, for example, reduce the potential for the processor bus agents to interfere with one or more security features of a computing system. For example, a processor bus agent may be quiesced during (at least a portion of) the establishment of protected domain 210. An embodiment of the invention is described below in which the processor bus agent is a manageability engine. In addition, the embodiment described below discusses quiescing the manageability engine during the establishment of a protected domain. In an alternative embodiment, different (or additional) processor bus agents may be quiesced. Similarly, in an alternative embodiment, the quiescing of the processor bus agent may be performed in circumstances other than the establishment of a processor bus agent.

Figure 3:
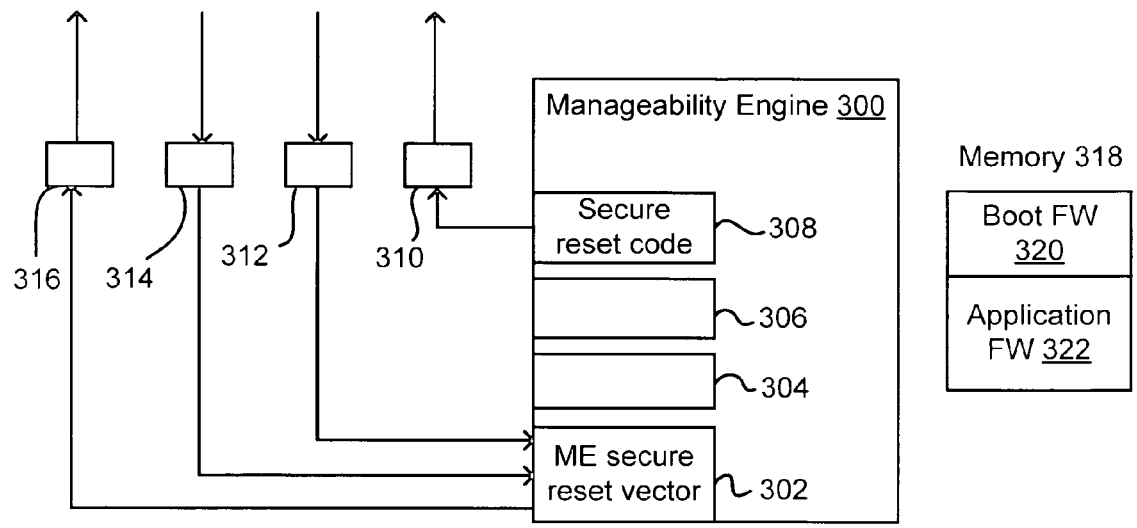
FIG. 3 is a block diagram illustrating selected aspects of a manageability engine according to an embodiment of the invention.

FIG. 3 is a block diagram illustrating selected aspects of a manageability engine according to an embodiment of the invention. In an embodiment, a processor controlling the establishment of a protected domain can quiesce and revive manageability engine 300. The ability to quiesce manageability engine 300 helps to ensure that manageability engine 300 does not interfere with the establishment of a protected domain (and/or the operation of other security features).

In an embodiment, memory 318 stores firmware code for manageability engine 300. The firmware is divided into two sections: boot firmware 320 and application firmware 322. Boot firmware 320 may have an Internet protocol (IP) address that is located at the normal power-up reset vector of manageability engine 300. Boot firmware 320 may be loaded from a protected memory to reduce the possibility of an unauthorized change in the code. The protected memory may be implemented as flash, read-only memory, and the like. In the case of flash memory, the memory may be protected by setting a flash lockdown bit at the end of the flash programming process. Application firmware 322 is application code that is typically used to implement a manageability function. In many cases, application firmware 322 may be provided by a different vendor than boot firmware 320.

Manageability engine 300 includes memory partitions 302-308. One or more of memory partitions 302-308 may be trusted memory partitions. A trusted memory partition refers to a memory partition that is only accessed by manageability engine 300. In an embodiment, one or more isolated latches 310-316 are associated with trusted memory partitions 302-308. Isolated latches 310-316 provide protected interfaces for trusted memory partitions 302-308. That is, isolated latches 310-316 may allow the processors of a computing system (e.g., computing system 100, shown in FIG. 1) to reach trusted memory partitions 302-308. Similarly, isolated latches 310-316 may allow trusted memory partitions 302-308 to reach the processors (or other entities).

Manageability engine (ME) secure reset vector 302 provides a trusted memory partition to store a vector to be followed in the event of a secure reset. In the illustrated embodiment, ME secure reset vector 302 provides a jump to ME secure reset code 308. In an embodiment, ME secure reset code 308 provides logic to quiesce manageability engine 300. The term "quiescing" manageability engine 300 broadly refers to limiting the ability of manageability engine 300 to present a security threat to its associated computing system. Quiescing manageability engine 300 may include: locking its internal power state; instructing it to enter a sleep state; and/or instructing it to enter a spin lock. The term spin lock refers, for example, to a lock in which a thread waits in a loop. Typically, spin locks are held until they are released or until the thread goes to sleep.

In one embodiment, ME secure reset code 308 performs the following tasks in response to an ME secure reset command. The ME secure reset code 308 calls any authenticated suspension callbacks that have been registered. An ME secure reset acknowledge bit 310 is set in, for example, a status register to acknowledge the receipt of the secure reset command. The ME secure reset code 308 then captures control of the ME by, for example, implementing an ME sleep state, an ME spin lock, or the like. In one embodiment, the ME secure reset code 308 sets an ME secure reset acknowledgement bit 310 to indicate, for example, that the ME is quiesced. After taking control of the ME, the ME secure reset code 308 may wait for an ME secure reset resume command 314. In response to receiving the ME secure reset resume command 314, the ME secure reset code revives the ME (e.g., cancels the ME sleep state or the ME spin lock).

In an embodiment, the ME secure reset code 308 supports additional functions. For example, secure reset code 308 may authenticate code, test code, add functions to itself, and the like. Latch 316 may provide an interface to support one or more of these additional functions of the ME secure reset code 308.

Figure 4:
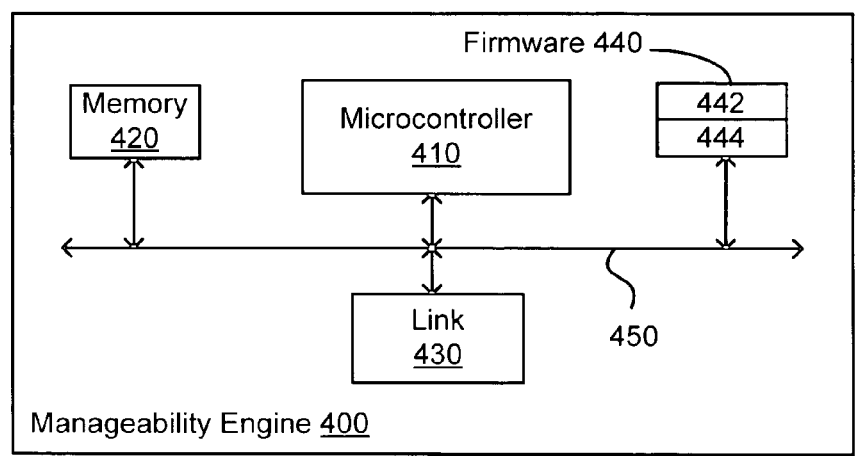
FIG. 4 is a block diagram of selected aspects of a manageability engine, implemented according to an embodiment of the invention.

FIG. 4 is block diagram of selected aspects of manageability engine 400, implemented according to an embodiment of the invention. Manageability engine 400 includes microcontroller 410, memory 420, private communications link 430 and firmware 440. In an embodiment, one or more of these components are interconnected via memory engine interconnect 450 as shown. Microcontroller 410 executes the code associated with manageability engine 400. Memory 420 may include general purpose memory, trusted memory, and/or cache memory to store code and data for manageability engine 400. In an embodiment, firmware 440 stores boot firmware 442 and application firmware 444.

Figure 5:
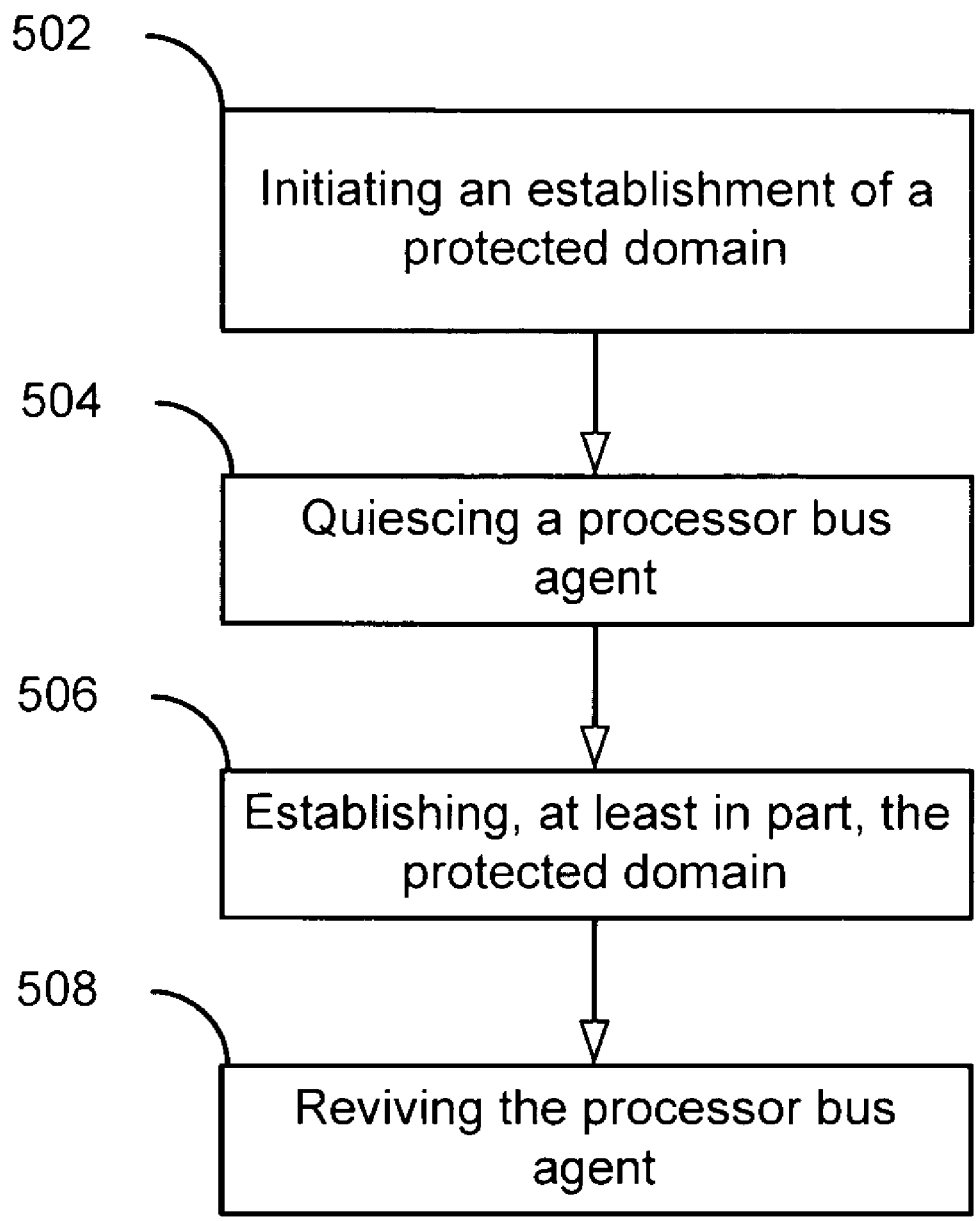
FIG. 5 is a flow diagram illustrating certain aspects of a method for quiescing a processor bus agent according to an embodiment of the invention.
Figure 6:
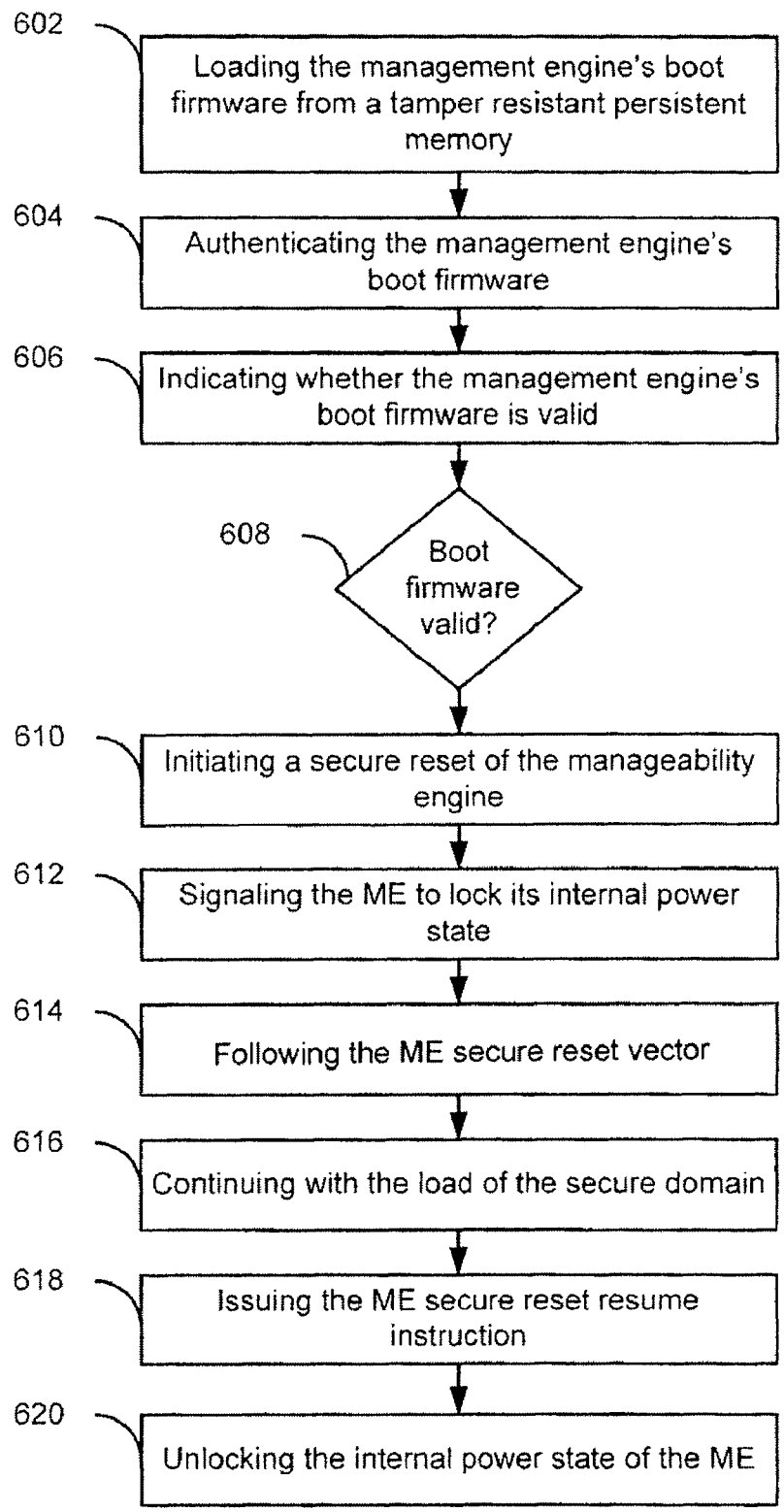
FIG. 6 is a flow diagram illustrating certain aspects of a method for quiescing a manageability engine according to an embodiment of the invention.

Turning now to FIGS. 5-6, the particular methods associated with embodiments of the invention are described in terms of computer software, firmware, and/or hardware with reference to a flowchart. The methods to be performed by a computing system and may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 5 is a flow diagram illustrating certain aspects of a method for quiescing a processor bus agent according to an embodiment of the invention. The processor bus agent may be, for example, a manageability engine. Referring to process block 502, a processor initiates the establishment of a protected domain. The processor may be a physical processor and/or a logical processor. In one embodiment, the processor controlling the establishment of the protected domain (or, for ease of reference, the processor) is a bootstrap processor.

Referring to process block 504, the processor quieces the processor bus agent. The term "quieces" broadly refers to limiting the ability of the processor bus agent to interfere with one or more security features of an associated computing system. In one embodiment, quiescing the processor bus agent refers to limiting (or, possibly, negating) the ability of the processor bus agent to interfere with the establishment of a protected domain. Examples of quiescing the processor bus agent include: signaling the processor bus agent to lock its internal power state; signaling the processor bus agent to enter a sleep state; and/or signaling the processor bus agent to implement a spin lock.

Referring to process block 506, the processor establishes, at least in part, the protected domain. In an embodiment, establishing (at least partly) the protected domain refers to implementing one or more stages of the establishment process. For example, in one embodiment, establishing the protected domain refers to completing the join process directed to joining the processors of the computing system with the protected domain.

Referring to process block 508, the processor revives (or partly revives) the processor bus agent. In one embodiment, the processor bus agent is revived subsequent to (or responsive to) the (at least partial) establishment of the protected domain. The term "reviving" the processor bus agent refers to returning the processor bus agent to an active state. For example, reviving the processor bus agent may include: unlocking the internal power state of the manageability engine; instructing the processor bus agent to exit a sleep state; and/or instructing the processor bus agent to exit a spin lock.

In an embodiment, the processor bus agent is a manageability engine (e.g., manageability engine 300, shown in FIG. 3). FIG. 6 is a flow diagram illustrating certain aspects of a method for quiescing a manageability engine according to an embodiment of the invention. At 602, the manageability engine's boot firmware is loaded from a tamper resistant persistent memory (e.g., 320, shown in FIG. 3). In one embodiment, the boot firmware is authenticated after it is loaded as shown by 604. For example, an authenticated code module may authenticate the boot firmware's cryptographic signature. The manageability engine provides an indication its boot firmware has been authenticated at 606. For example, the manageability engine may set an ME boot firmware valid bit latch (e.g., latch 316, shown in FIG. 3) to indicate that the ME boot firmware has been authenticated.

Referring to process block 608, processor microcode checks to see whether the ME boot firmware has been authenticated. In one embodiment, this check is made at the start of the establishment of a protected partition. This check may be performed prior to, for example, initiating a join process to join the processors of the computing system to the protected domain.

The process controlling the establishment of the protected domain (or, ease of reference, the processor) initiates a secure reset of the manageability engine at 610. In an embodiment, the secure reset limits the ability of the manageability engine to interfere with the establishment of the protected domain. That is, in an embodiment, the secure reset is a mechanism for quiescing the manageability engine. At 612, the manageability engine is signaled to lock its internal power state. At 614, the manageability engine's secure reset vector is followed. In one embodiment, the trusted memory partition stores the secure reset vector to be followed in the event of a secure reset. At 616, the secured or protected domain is continued to be loaded. At 618, the secure reset resume instruction for the manageability engine is issued. At 620, the locked internal power state of the manageability engine is unlocked.

FIGS. 7A and 7B are block diagrams illustrating, respectively, selected aspects of computing systems 700 and 800. Computing system 700 includes processor 710 coupled with an interconnect 720. In some embodiments, the term processor and central processing unit (CPU) may be used interchangeably. In one embodiment, processor 710 is a processor in the XEON® family of processors available from Intel Corporation of Santa Clara, Calif. In an alternative embodiment, other processors may be used. In yet another alternative embodiment, processor 710 may include multiple processor cores.

According to one embodiment, interconnect 720 communicates with chip 730. In one embodiment, chip 730 is a component of a chipset. Interconnect 720 may be a point-to-point interconnect or it may be connected to two or more chips (e.g., of the chipset). Chip 730 includes memory controller 740 which may be coupled with main system memory (e.g., as shown in FIG. 1). In an alternative embodiment, memory controller 740 may be on the same chip as processor 710 as shown in FIG. 7B. In an embodiment, manageability engine 742 can be dynamically quiesced to, for example, limit its ability to interfere with a security feature of computing systems 700 and 800.

Input/output (I/O) controller 750 I/O controls the flow of data between processor 710 and one or more I/O interfaces (e.g., wired and wireless network interfaces) and/or I/O devices. For example, in the illustrated embodiment, I/O controller 750 controls the flow of data between processor 710 and wireless transmitter and receiver 760. In an alternative embodiment, memory controller 740 and I/O controller 750 may be integrated into a single controller.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. A method comprising:
    initiating an establishment of a protected domain for a computing system having one or more processors;
    quiescing, at least in part, a manageability engine having a processor bus agent for communicating with the one or more processors, responsive to the initiating of the establishment of the protected domain;
    establishing, at least in part, the protected domain in response to the quiescing;
    issuing a secure reset resume instruction for the manageability engine after the establishing of the protected domain; and
    reviving, at least in part, the manageability engine responsive to the issuing of the secure reset resume instruction.

2. The method of claim 1, wherein the establishing of the protected domain for the computing system comprises:
    initiating a join process, the join process to join the one or more processors to the protected domain.

3. The method of claim 1, wherein quiescing, at least in part, the manageability engine, responsive to initiating a secure reset of a manageability engine comprises at least one of:
    signaling the manageability engine to lock its power state;
    signaling the manageability engine to enter a sleep state; and
    signaling the manageability engine to implement a spin lock.

4. The method of claim 1, wherein quiescing, at least in part, the manageability engine comprises:
    confirming that boot firmware for the manageability engine is authenticated;
    initiating a secure reset of the manageability engine; and
    receiving an acknowledgement from the manageability engine, the acknowledgement to indicate that the secure reset of the manageability engine is initiated.

5. The method of claim 1, wherein reviving the manageability engine responsive to issuing the secure reset resume instruction comprises at least one of:
    signaling the manageability engine to unlock its power state;
    signaling the manageability engine to exit a sleep state; and
    signaling the manageability engine to exit a spin lock.

6. An apparatus comprising:
    a protected domain establishment process controller to initiate the establishment of a protected domain for a computing system; and
    a manageability engine having a processor bus agent coupled with the protected domain establishment process controller, wherein the manageability engine is capable of quiescing responsive to an instruction from the protected domain establishment process controller, wherein the quiescing limits the ability of the manageability engine to interfere with security features of the computing system, and wherein
    the protected domain establishment process controller to:
        establish, at least in part, the protected domain in response to the quiescing, and
        issue a secure reset resume instruction for the manageability engine after the establishing of the protected domain to revive the manageability engine.

7. The apparatus of claim 6, wherein the protected domain establishment process controller is a bootstrap processor.

8. The apparatus of a claim 6, wherein the manageability engine is implemented within a memory controller, the memory controller to control, at least partly, memory access for the computing system.

9. The apparatus of claim 6, wherein the manageability engine comprises:
a secure reset vector to provide logic to quiesce the manageability engine.

10. The apparatus of claim 9, wherein the logic to quiesce the manageability engine comprises at least one of:
logic to lock an internal power state of the manageability engine;
logic to implement a sleep state for the manageability engine; and
logic to implement a spin lock for the manageability engine.

11. The apparatus of claim 6, wherein the manageability engine further comprises a manageability engine boot firmware signature to validate boot firmware associated with the manageability engine.

12. The apparatus of claim 6, wherein the manageability engine further comprises:
a manageability engine secure reset control bit to quiesce the manageability engine; and
a manageability engine secure reset resume control bit to revive the manageability engine.

13. The apparatus of claim 6, wherein the manageability engine further comprises at least one of:
a manageability engine boot firmware valid bit for indicating authenticated manageability engine boot firmware; and
a manageability engine secure reset acknowledge bit to indicate that the manageability engine is quiesced.

14. A system comprising:
a processor to establish a protected domain for the system;
a manageability engine having a processor bus agent coupled with the processor, the manageability engine capable of quiescing responsive to an instruction from the processor, and wherein
the processor to:
establish, at least in part, the protected domain in response to the quiescing, and
issue a secure reset resume instruction for the manageability engine after the establishing of the protected domain to
revive the manageability engine; and
a memory coupled with the manageability engine, the memory to provide persistent storage for the manageability engine.

15. The system of claim 14, wherein the manageability engine is, at least in part, a component of a memory controller.

16. The system of claim 14, wherein the processor is a bootstrap processor.

17. A method comprising:
initiating establishment of a protected domain for a computer system;
quiescing a manageability engine having a processor bus agent, the quiescing in response to the initiating;
establishing the protected domain; and
reviving the manageability engine in response to establishing the protected domain.

18. The method of claim 17, wherein the manageability engine includes a processor bus agent.

19. The method of claim 17, wherein a first processor performs the initiating of the establishment of the protected domain.

20. The method of claim 19, wherein the first processor is a bootstrap processor.

21. The method of claim 17, wherein the manageability engine is implemented with a memory controller.

22. The method of claim 21, wherein the manageability engine is implemented with a microcontroller within the memory controller.

23. The method of claim 17, wherein the manageability engine has associated boot firmware and application firmware.

24. The method of claim 17, wherein the manageability engine has associated trusted memory partitions.

25. The method of claim 17, wherein a protocol for establishing the protected domain is embodied in trusted code that is authenticated prior to its use.

26. The method of claim 17, wherein the establishing of the protected domain includes:
executing a join process to permit processors to join the protected domain; and
loading a domain manager that provides isolation between the protected domain and a standard domain.

27. The method of claim 17, wherein the quiescing of the manageability engine comprises:
causing the manageability engine to jump to secure reset code;
executing the secure reset code to cause any of the following:
locking the manageability engine's internal power state;
causing the manageability engine to enter a spin lock; and
causing the manageability engine to enter a sleep state.

28. The method of claim 27, wherein the jump to the secure reset code is caused by a secure reset command.

29. The method of claim 28, wherein the authenticity of the manageability engine's boot firmware is confirmed before the secure reset command is issued.

30. The method of claim 29, wherein the manageability engine's boot firmware is authenticated by an authenticated code module.

31. The method of claim 17, wherein a start address of a trusted core for the protected domain is not received from the manageability engine during the establishing of the protected domain.

* * * * *